United States Patent
Aitken

(10) Patent No.: US 12,258,937 B2
(45) Date of Patent: Mar. 25, 2025

(54) METHOD OF DISMOUNTING OR MOUNTING A ROTOR BLADE OF A WIND TURBINE

(71) Applicant: LiftWerx Solutions Inc., Cambridge (CA)

(72) Inventor: Glen D. Aitken, Guelph (CA)

(73) Assignee: LiftWerx Solutions Inc., Cambridge (CA)

(*) Notice: Subject to any disclaimer, the term of this patent is extended or adjusted under 35 U.S.C. 154(b) by 0 days.

(21) Appl. No.: 18/554,036

(22) PCT Filed: Apr. 14, 2022

(86) PCT No.: PCT/CA2022/050581
§ 371 (c)(1),
(2) Date: Oct. 5, 2023

(87) PCT Pub. No.: WO2022/217362
PCT Pub. Date: Oct. 20, 2022

(65) Prior Publication Data
US 2024/0328391 A1    Oct. 3, 2024

Related U.S. Application Data

(60) Provisional application No. 63/175,217, filed on Apr. 15, 2021.

(51) Int. Cl.
*F03D 13/10* (2016.01)
*B66C 23/18* (2006.01)
(Continued)

(52) U.S. Cl.
CPC .......... *F03D 13/104* (2023.08); *B66C 23/185* (2013.01); *B66C 23/207* (2013.01);
(Continued)

(58) Field of Classification Search
CPC .... F03D 13/40; F03D 13/104; F05B 2230/61; F05B 2230/70; B66C 23/185; B66C 23/207
See application file for complete search history.

(56) References Cited

U.S. PATENT DOCUMENTS

| 7,670,090 B1 | 3/2010 | Landrum et al. |
| 8,506,255 B2 | 8/2013 | Wobben |

(Continued)

FOREIGN PATENT DOCUMENTS

| CN | 103723614 A | 4/2014 |
| CN | 105649893 A | 6/2016 |
| WO | 2013/167138 A1 | 11/2013 |

OTHER PUBLICATIONS

International Search Report and Written Opinion dated Jun. 13, 2023 on PCT/CA2022/050581.
(Continued)

*Primary Examiner* — Moshe Wilensky
(74) *Attorney, Agent, or Firm* — Brunet & Co. Ltd.; Robert Brunet; Hans Koenig

(57) ABSTRACT

A method of dismounting or mounting a rotor blade of a wind turbine involves: supporting a rotor blade of a wind turbine with a ground-based lift system at a tip-side position on the rotor blade in relation to a center of gravity of the rotor blade, and supporting the rotor blade with a nacelle-mounted lift system at a hub-side position on the rotor blade in relation to the center of gravity of the rotor blade, so that the rotor blade is supported by the ground-based lift system and the nacelle-mounted lift system in a substantially non-vertical orientation with respect to the ground; and, then separating the rotor blade from or connecting the rotor blade to a rotor hub of the wind turbine.

10 Claims, 6 Drawing Sheets

(51) Int. Cl.
    *B66C 23/20* (2006.01)
    *F03D 13/40* (2016.01)
(52) U.S. Cl.
    CPC .......... *F03D 13/40* (2016.05); *F05B 2230/61* (2013.01); *F05B 2230/70* (2013.01)

(56) References Cited

U.S. PATENT DOCUMENTS

| | | |
|---|---|---|
| 9,651,020 B2 | 5/2017 | Holloway et al. |
| 10,584,684 B2 | 3/2020 | Nielsen et al. |
| 2010/0139062 A1 | 6/2010 | Reed et al. |
| 2016/0369770 A1 | 12/2016 | Vuillaume et al. |
| 2019/0195203 A1 | 6/2019 | Fujioka |
| 2020/0071138 A1 | 3/2020 | Aitken et al. |
| 2020/0088169 A1 | 3/2020 | Lund-Laverick et al. |
| 2020/0332761 A1 | 10/2020 | Pedersen |

OTHER PUBLICATIONS

International Preliminary Report on Patentability dated Jul. 18, 2023 on PCT/CA2022/050581.
Office action dated Sep. 27, 2023 on Canadian application 3,206,051.
General Electric GE50.2 Blade Drawing No. 103W2754_F—Support and Lift Locations (2010).
General Electric GE56.9 Blade Drawing No. 444W3220_B—Support and Lift Locations (2015).
General Electric GE62.2 Blade Drawing No. 446W0305_A—Support and Lift Locations (2017).
LM Wind Power LM-37.3 Blade Handling Drawing (2006).
LM Wind Power LM-40.0 Blade Rigging Drawing (2009).
LM Wind Power LM-62.2 Blade Handling Drawing (2020).
Siemens Wind Power B53-00 Blade Rigging Drawing (2012).
Siemens Wind Power B53 Blade Rigging Drawing (2011).
Arakawa C, et al. Journal of the Earth Simulator, vol. 2, Mar. 2005, 11-33.
Shohag Mas, et al. Wind Engineering. 2017, vol. 41(3) 185-210.
Zhang S, et al. Sensors. 2015, 15, 19768-19782; doi:10.3390/s150819768.
European Search Report dated Jan. 28, 2025 on European application 22786744.7.

METHOD OF DISMOUNTING OR MOUNTING A ROTOR BLADE OF A WIND TURBINE

CROSS-REFERENCE TO RELATED APPLICATIONS

This application is a § 371 national entry of PCT/CA2022/050581 filed Apr. 14, 2022, which claims the benefit of U.S. Provisional Patent application Ser. No. 63/175,217 filed Apr. 15, 2021, the entire contents of both of which are herein incorporated by reference.

FIELD

This application relates to wind turbines, in particular to a method of dismounting or mounting a rotor blade of a wind turbine.

BACKGROUND

From time-to-time, rotor blades of a wind turbine require maintenance or replacement, or a rotor hub itself requires maintenance or replacement. In order to perform such replacements, and in many cases such maintenance, one or more of the rotor blades must be disconnected from the rotor hub and lowered to the ground from the top of the tower of the wind turbine. Likewise, a replacement rotor blade must be lifted up from the ground to the rotor hub at the top of the tower and then connected to the rotor hub. Various lifting methods and systems have been proposed in the art to accomplish the task of lowering and lifting rotor blades.

In one example, Chinese Patent Publication CN 105649893 published Jun. 8, 2016 proposes a clamping device that supports a rotor blade, the clamping device connected to a single ground-based crane to lift and lower the clamping device with the rotor blade clamped therein. However, during lowering and lifting of the rotor blade, the free ends of the rotor blade are prone to swinging in the wind causing the rotor blade to rotate about a vertical axis creating difficulties in properly positioning the rotor blade especially during mounting. Such difficulties are further exacerbated by a lack of connection of the rotor blade to the wind turbine during lowering and lifting.

In Chinese Patent Publication CN 103723614 published Apr. 16, 2014, two blade clamping devices are used, one close to the hub-end of the rotor blade. While offering better control over the ends of the rotor blade during lowering and lifting, the system still suffers from difficulties in properly positioning the rotor blade especially during mounting because the rotor blade is still able to rotate in the wind. Additionally, it is difficult to stab the blade studs into the holes in the hub at an angle, resulting in the risk of damaging the studs.

In a different approach, for example the systems disclosed in US 2010/139062 published Jun. 10, 2010 and US 2020/0071138 published Mar. 5, 2020, the latter of which is herein incorporated by reference in its entirety, a rotor blade is oriented vertically, and sheathed in a sleeve that supports the rotor blade. The sleeve is supported by a lift system mounted atop the wind turbine and the sleeve raised and lowered by the lift system with the rotor blade sheathed therein. Such systems utilize a tailing crane connected to a tip of the vertically-oriented rotor blade and the blade must be slowly brought to horizontal by driving the tailing crane as the rotor blade is lowered, or slowly brought to vertical by driving the tailing crane as the rotor blade is raised. This system can be difficult to use, as it requires the installation and removal of a considerable amount of tooling inside the hub, resulting in an operation which is laborious, difficult, and requires a lot of time.

There remains a need for a system and method of dismounting or mounting a rotor blade of a wind turbine that is more efficient and controllable.

SUMMARY

In one aspect, there is a method of dismounting or mounting a rotor blade of a wind turbine, the method comprising: supporting a rotor blade of a wind turbine with a ground-based lift system at a tip-side position on the rotor blade in relation to a center of gravity of the rotor blade, and supporting the rotor blade with a nacelle-mounted lift system at a hub-side position on the rotor blade in relation to the center of gravity of the rotor blade, so that the rotor blade is supported by the ground-based lift system and the nacelle-mounted lift system in a substantially non-vertical orientation with respect to the ground; and, then separating the rotor blade from or connecting the rotor blade to a rotor hub of the wind turbine.

In another aspect, there is a method of dismounting a rotor blade of a wind turbine, the method comprising: mobilizing a ground-based lift system to a site of the wind turbine, the ground-based lift system having a boom with sufficient boom length to reach a rotor hub of the wind turbine; rotating the rotor hub so that a rotor blade to be dismounted is substantially horizontal relative to the ground, and then locking rotation of the rotor hub; opening a lid of a nacelle of the wind turbine; using the ground-based lift system, lifting a nacelle-mountable lift system up to the nacelle and mounting the nacelle-mountable lift system to become a nacelle-mounted lift system on the nacelle so that a lift line of the nacelle-mounted lift system is extendible downward at a side of the rotor hub; connecting a lift line of the ground-based lift system at a tip-end of the rotor blade; connecting the lift line of the nacelle-mounted lift system at a hub-end of the rotor blade; disconnecting the rotor blade from the rotor hub; lowering the rotor blade toward the ground using the nacelle-mounted lift system and the ground-based lift system keeping the rotor blade substantially horizontal with respect to the ground; and, once the rotor blade is lowered to ground-level so that the rotor blade is supported on the ground, disconnecting the lift lines from the rotor blade.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
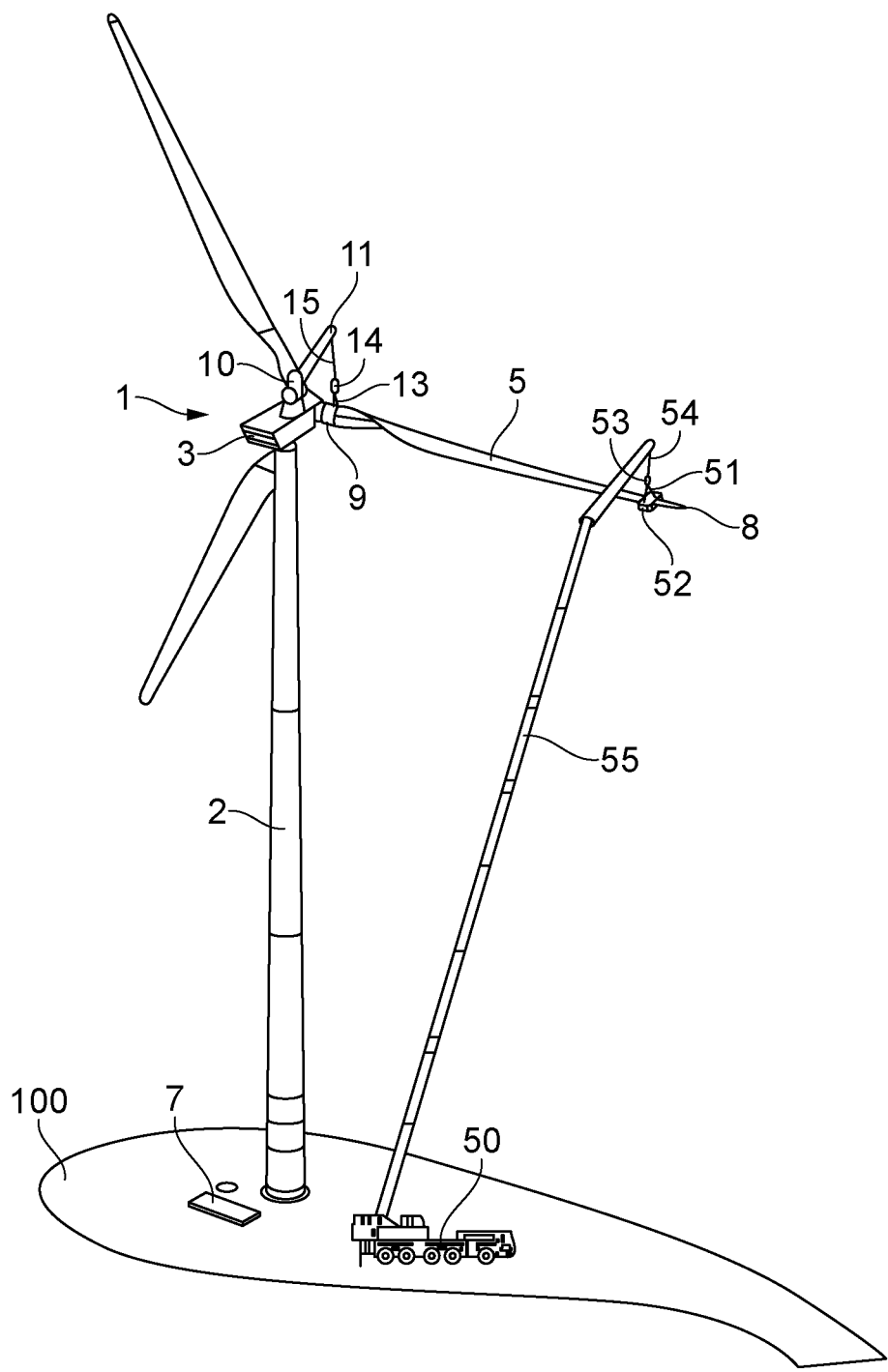
FIG. 1 depicts a perspective view of a wind turbine with a nacelle-mounted lift system mounted thereatop and a ground-based lift system adjacent the wind turbine, the lift systems connected to a rotor blade of the wind turbine in a 9 o'clock orientation.

Two lift systems are employed to support a rotor blade of a wind turbine during dismounting or mounting of the rotor blade on a rotor hub of the wind turbine. Advantageously, the lift systems can be connected at any point along a length of the rotor blade provided one of the lift systems is connected at one side of a center of gravity of the rotor blade and the other of the lift systems is connected at the other side of the center of gravity. Since the nacelle-mounted lift system is mounted on the nacelle, the nacelle-mounted lift system is preferably connected to the rotor blade on a hub-side of the center or gravity of the rotor blade and the ground-based lift system is connected to the rotor blade at a tip-side of the center of gravity of the rotor blade.

The lift systems are independently connected to the rotor blade. Operation of the nacelle-mounted lift system can be done independently of operation of the ground-based lift system. Independent operation of the lift systems provides for better handling of and more control over the rotor blade when the rotor blade is not connected to the rotor hub. Independent control over the motion of the rotor blade on each side of the center of gravity permits corrections to be readily made to the position and orientation of the rotor blade in space as the rotor blade is being lowered or raised by the lift systems. Although the lift systems are independently operable, coordination of the lift systems is performed in order to lower or raise ends of the rotor blade at desired rates to ensure that the rotor blade is properly oriented at ground-level to be supported on the ground. At ground-level, the rotor blade can be supported directly on the ground, on an immovable support structure on the ground or on a movable support structure (e.g., a flat bed of a transport trailer).

The use of a nacelle-mounted lift system together with a ground-based lift system, whereby the ground-based lift system can reach up to the rotor hub provides a number of advantages over the use of a single ground-based lift system or a combination of a nacelle-mounted lift system and a short tailing crane. Use of a single ground-based lift system provides less control over the motion of the rotor blade during lowering or raising because the same lift system supports the rotor blade on both sides of the center of gravity, thereby making the rotor blade more difficult to properly orient when being connected to the rotor rub once raised or when being loaded onto a ground-based support once lowered. Further, with a single ground-based lift system, it is much more difficult and requires special rigging in order to dismount and mount a rotor blade when the rotor blade is not oriented horizontally, and it requires utmost position of the rigging with respect to the center of gravity; otherwise, instability will result. Use of a combination of a nacelle-mounted lift system and a short tailing crane requires the rotor blade to be disconnected or connected to the rotor hub with the blade in a substantially vertical orientation (6 o'clock position) and requires the use of special blade sleeves and/or special blade clamps and/or more complicated rigging in order for the nacelle-mounted lift system to be able to support the rotor blade. Further, the short tailing crane must drive or swing along the ground during lowering and raising of the rotor blade, which may not be possible in some terrains and adds to the difficulty of controlling the motion of the rotor blade during lowering and raising of the rotor blade.

Rotor blades can thus be removed more quickly using the present method with a nacelle-mounted lift system together with a ground-based lift system in comparison to using a single ground-based lift system or a combination of a nacelle-mounted lift system and a short tailing crane. The present method also requires much less ground footprint.

Connection of the rotor blade to the ground-based lift system and the nacelle-mountable lift system is preferably accomplished using one or more blade supports, for example, one or more blade clamps, slings and the like. The method advantageously permits the use of simple sling arrangements to support the rotor blade, although special blade clamps or more complicated rigging can be used if desired. The blade supports are connected to the lift systems by holders of the lift system, for example hooks.

Immediately prior to disconnecting the rotor blade from the rotor hub or immediately prior to connecting the rotor blade to the rotor hub, the rotor blade is supported by the ground-based lift system and the nacelle-mounted lift system in a substantially non-vertical orientation with respect to the ground. A 'substantially non-vertical' orientation is an orientation of the rotor blade in which a longitudinal axis of the rotor blade is oriented greater than ±45° from a vertical plane with respect to the ground. A 'substantially non-vertical' orientation is an orientation of the rotor blade in which a longitudinal axis of the rotor blade is oriented within ±45° of a horizontal plane with respect to the ground. The longitudinal axis of the rotor blade is preferably oriented within ±30° of a horizontal plane with respect to the ground. The rotor blade is more preferably in a 'substantially horizontal' orientation just prior to disconnecting the rotor blade from the rotor hub or just prior to connecting the rotor blade to the rotor hub. A 'substantially horizontal' orientation is an orientation of the rotor blade in which a longitudinal axis of the rotor blade is oriented within ±5° of a horizontal plane with respect to the ground. The longitudinal axis of the rotor blade is most preferably oriented horizontally (e.g., in the 3 o'clock position or 9 o'clock position).

The ground-based lift system has sufficient length to reach the rotor hub of the wind turbine in order to be connected to and support the rotor blade while the rotor blade is still on the rotor hub. Preferably, the ground-based lift system has sufficient reach to extend at least 10 m beyond hub height. For example, the ground-based lift system may be a ground-based crane having a boom of sufficient length to reach the rotor hub, and preferably beyond the rotor hub. Appropriate ground-based lift systems, such as ground-based cranes are known in the art.

The nacelle-mounted lift system may comprise any suitable lift system that is mountable on the nacelle of the wind turbine and is sufficiently robust to support a rotor blade. Various suitable lift systems are known in the art. Preferably, a lift system as described in US 2020/0071138 is used. In some embodiments, such a lift system comprises a nacelle-mountable crane comprising a base removably mountable on a nacelle of the wind turbine, a boom arm mounted on the base, a winch mounted on the boom arm, at least one sheave rotatably mounted on the boom arm, a holder and at least one lift cable passing over the at least one sheave connecting the holder to the winch, the boom arm positionable to position the holder beyond the side of the rotor hub when the crane is mounted on the nacelle, and the holder connected to the rotor blade at the hub-side position on the rotor blade. The nacelle-mountable crane may utilize one sheave and one lift line, or, if a more robust lift system is desired, the nacelle-mountable crane may utilize more than one sheave and more than one lift line (e.g., two sheaves and two lift lines) with a larger winch.

Figure 2:
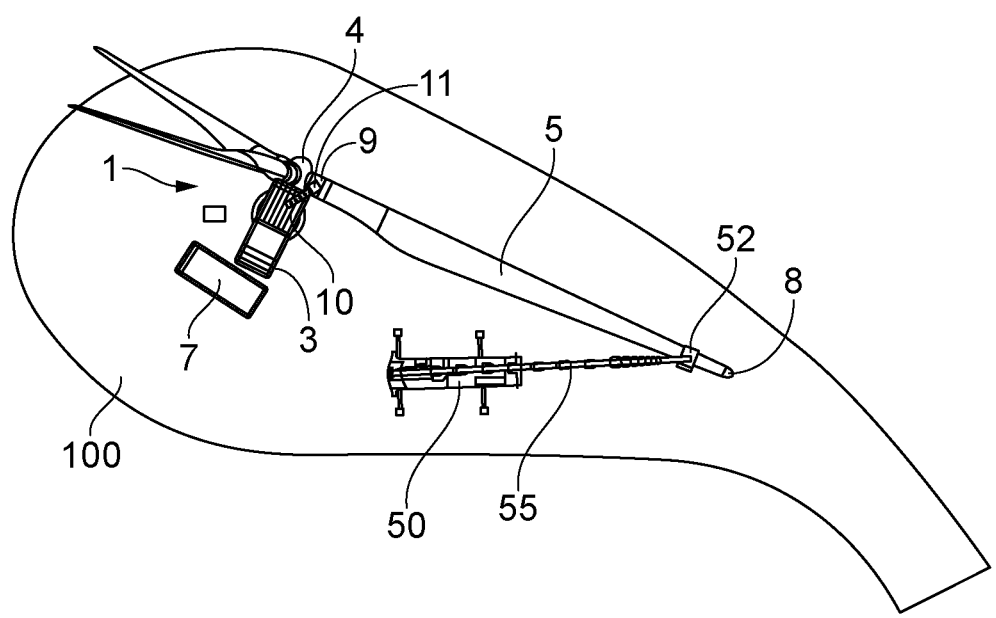
FIG. 2 depicts a top view of FIG. 1.
Figure 3:
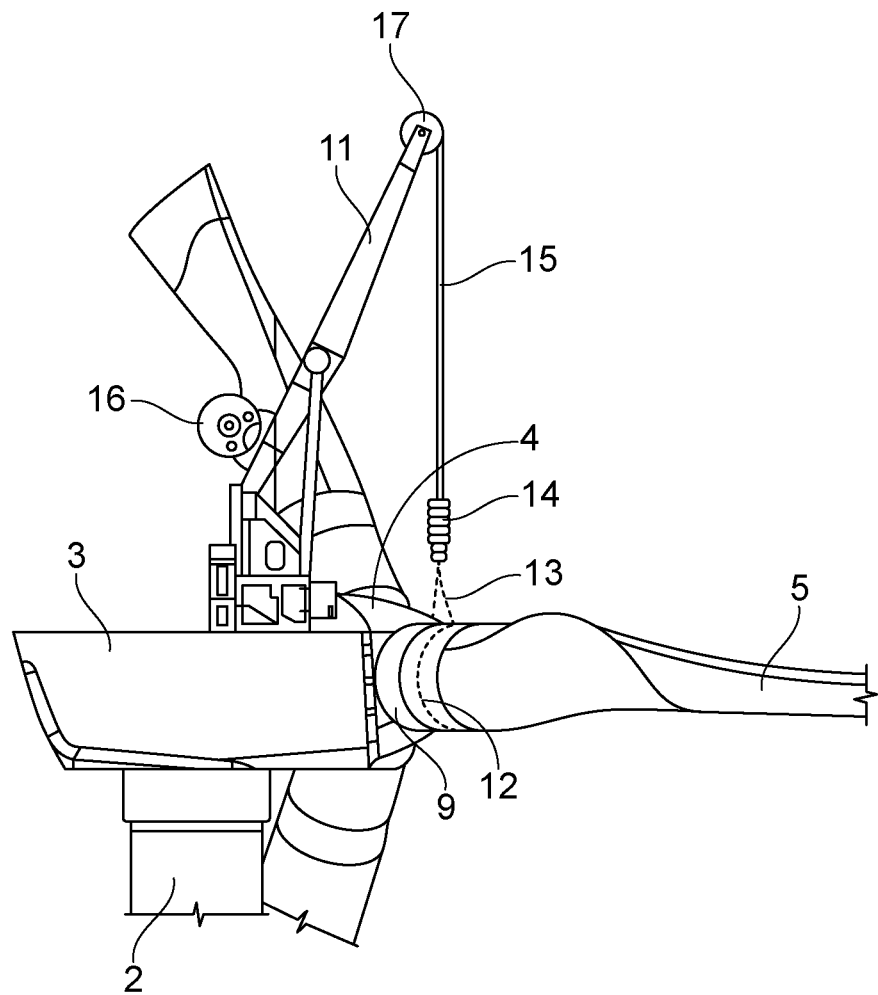
FIG. 3 depicts a magnified view of a rotor hub of the wind turbine of FIG. 1 showing more detail of the nacelle-mounted lift system.
Figure 4:
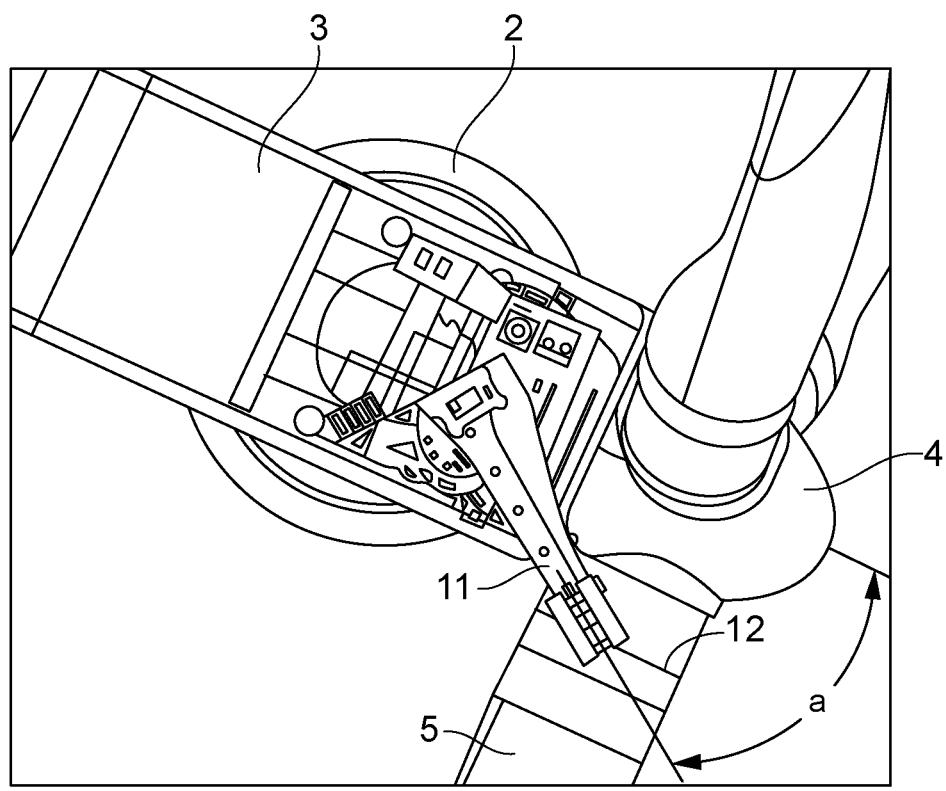
FIG. 4 depicts a top view of FIG. 3.
Figure 5A:
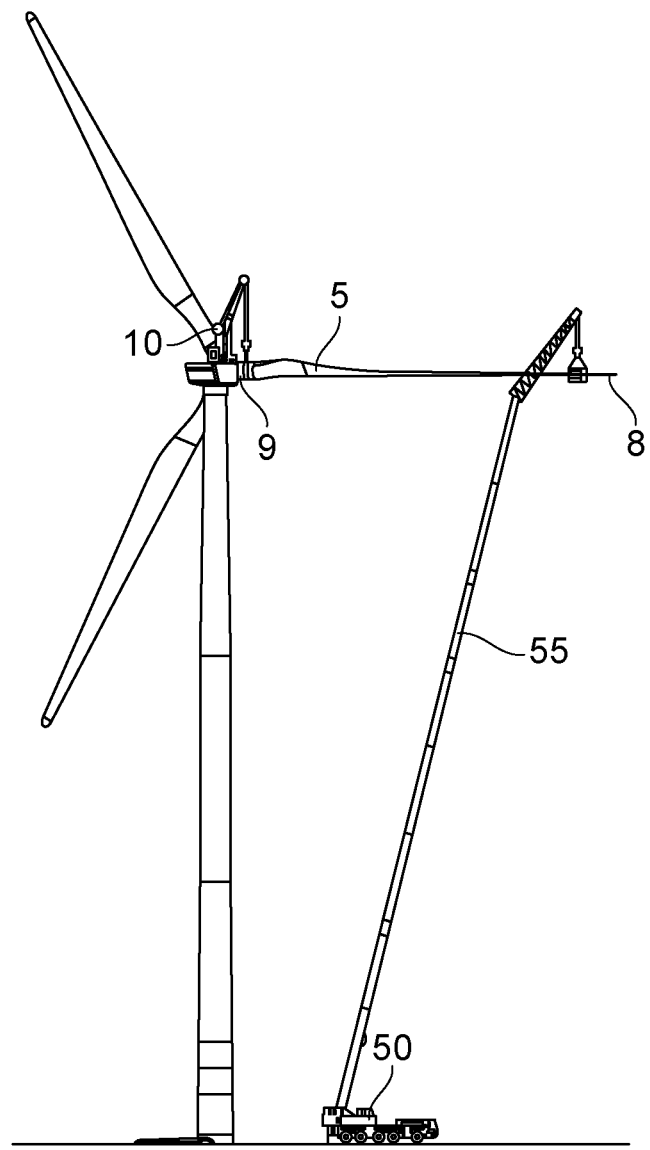
FIG. 5A depicts a rear view of FIG. 1.
Figure 5B:
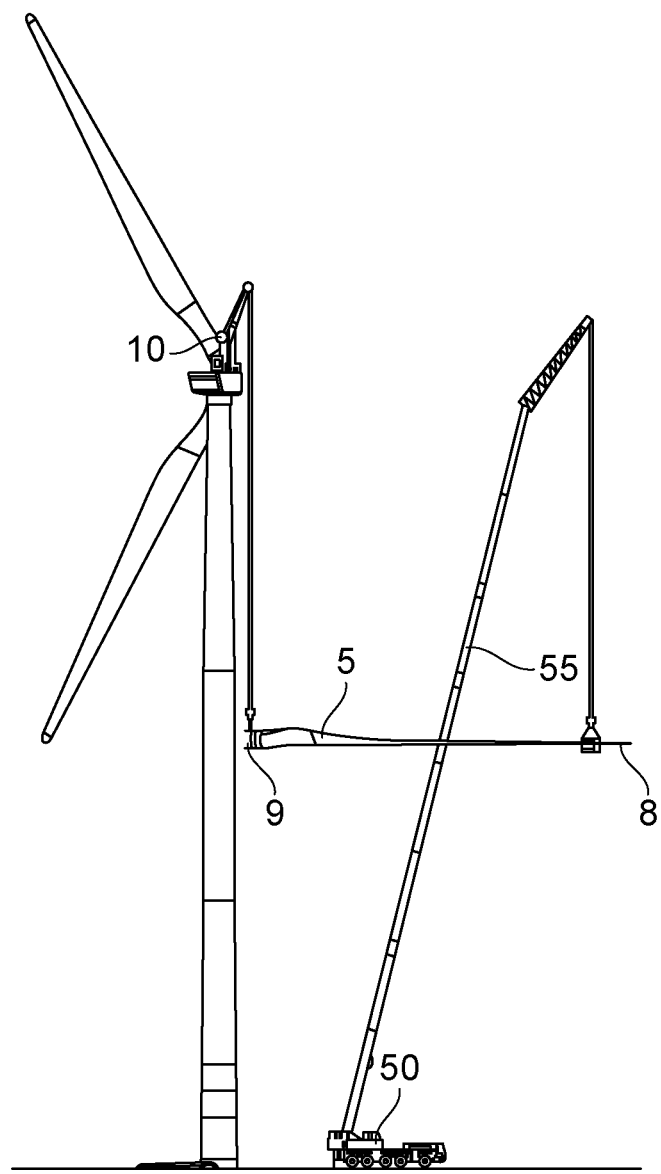
FIG. 5B depicts a rear view of FIG. 1 with the rotor blade suspended in a horizontal orientation about halfway between a top of the wind turbine and the ground.

With reference to FIG. 1, FIG. 2, FIG. 3, FIG. 4, FIG. 5A and FIG. 5B, an arrangement of two lift systems, a nacelle-mounted crane 10 and a large tailing crane 50, in association with a wind turbine 1 is shown illustrating a method of dismounting or mounting a rotor blade 5 from or to a rotor hub 4 of the wind turbine 1.

The tailing crane 50 is first mobilized to the site 100 of the wind turbine 1 and positioned according to a lift plan while confirming that sufficient space exists to set the rotor blade 5 on the ground, if required.

The rotor hub 4 is rotated using a turning gear so that the rotor blade 5 to be dismounted is in the desired orientation relative to the ground (e.g., substantially horizontally oriented). A nacelle 3 atop a tower 2 of the wind turbine 1 is yawed into a position in accordance with the lift plan, accounting for wind direction and the position at which the tailing crane 50 must be located. Thus, nacelle yaw capabilities are used to optimize the method by angling the rotor hub 4 so that wind impinges on the rotor blade 5 or rotor hub 4 in a more favorable direction (e.g., into the wind). The rotor hub 4 is locked with a high-speed and/or low-speed rotor lock to prevent rotation of the rotor hub 4 once the rotor hub 4 is in the desired position.

Using the tailing crane 50 a lid 7 of the nacelle 3 is opened, and, if necessary, placed on the ground at a base of the tower 2.

Using the tailing crane 50, the nacelle-mounted crane 10 is lifted up to the nacelle 3 and mounted on the nacelle 3 so that a boom arm 11 can extend to a side of the rotor hub 4 at an angle a that is appropriate to properly align a lift line 15 of the nacelle-mounted crane 10 with the trailing edge of the rotor blade 5, the lift line 15 extending downward at a side of the rotor hub 4.

Blade tip rigging 51 is assembled to a tailing crane hook 53 of the tailing crane 50 at ground level and secured two taglines (not shown) to each side of a tip sling 52. The hook 53 is connected to a lift line 54 extending downward from an end of a boom 55 of the tailing crane 50. The blade tip rigging 51 is hoisted up to a tip 8 of the rotor blade 5 and installed onto the rotor blade 5 at a tip-end of the rotor blade 5, for example at a location on the rotor blade 5 about 2-3 metres from the tip 8, so that the tip-end of the rotor blade 5 is supported by the tip sling 52.

A root sling 12, having blade-root rigging 13 connected thereto, is installed on onto the rotor blade 5 at a hub-end of the rotor blade 5 while the rotor blade 5 is still connected to the rotor hub 4. The root sling 12 is choked around the rotor blade 5 at the hub-end of the rotor blade 5 about 1-2 metres from a root 9 of the rotor blade 5. The blade-root rigging 13 is then connected to a nacelle-mounted crane hook 14, which is attached to the lift line 15 extending downward from a boom arm 11 of the nacelle-mounted crane 10. The lift line 15 passes through a sheave 17 at a distal end of the boom arm 11 to a winch 16 mounted on the boom arm 11 of the nacelle-mounted crane 10. With both cranes 10, 50 fully rigged to the rotor blade 5, the nacelle-mounted crane 10 is pre-tensioned to a load appropriate for the specific model of the rotor blade 5.

The rotor blade 5 is then disconnected from the rotor hub 4 by removing all of the nuts from the studs that hold the root 9 of the rotor blade 5 to the rotor hub 4, and removing the studs from a pitch bearing of the rotor blade 5. The rotor blade 5 is thereby released, which permits separation of the rotor blade 5 from the rotor hub 4. The cranes 10, 50 may be operated to assist with disengaging the blade studs from the hub.

The rotor blade 5 is lowered toward the ground using the nacelle-mounted crane 10 and the ground-based crane 50 keeping the rotor blade substantially horizontal with respect to the ground. The nacelle-mounted crane 10 and the ground-based crane 50 are operated to lower the tip 8 and the root 9 of the rotor blade 5 at substantially the same rate, and are operated to compensate for movement of the rotor blade 5 due to environmental factors. Once the rotor blade 5 is lowered all the way to ground-level so that the rotor blade 5 is supported on the ground, or a blade stand, the lift lines, slings and/or rigging are disconnected from the rotor blade 5.

To mount a rotor blade on the rotor hub, the steps are reversed.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A method of dismounting or mounting a rotor blade of a wind turbine, the method comprising:
   supporting the rotor blade of the wind turbine with a ground-based lift system at a support location on the rotor blade at a tip-end of the rotor blade 2-3 m from the tip of the rotor blade, and supporting the rotor blade with a nacelle-mounted lift system at a hub-side position on the rotor blade in relation to a center of gravity of the rotor blade, so that the rotor blade is supported by the ground-based lift system and the nacelle-mounted lift system in a substantially non-vertical orientation with respect to the ground, the ground-based lift system and the nacelle-mounted lift system providing independent control over motion of the rotor blade on each side of the center of gravity of the rotor blade; and,
   then separating the rotor blade from or connecting the rotor blade to a rotor hub of the wind turbine.

2. The method of claim 1, wherein the substantially non-vertical orientation is a substantially horizontal orientation.

3. The method of claim 1, wherein the nacelle-mounted lift system comprises a nacelle-mounted crane with a boom arm, the boom arm extending to a side of the rotor hub.

4. The method of claim 3, wherein the nacelle-mounted crane comprises a base removably mounted on a nacelle of the wind turbine, the boom arm mounted on the base, a winch mounted on the boom arm, at least one sheave rotatably mounted on the boom arm, a holder and at least one lift cable passing over the at least one sheave connecting the holder to the winch, the boom arm positionable to position the holder beyond the side of the rotor hub when the crane is mounted on the nacelle, and the holder connected to the rotor blade at the hub-side position on the rotor blade.

5. The method of claim 1, wherein the ground-based lift system comprises a ground-based crane with a boom, the boom extending from ground-level up to a height of the rotor hub.

6. The method of claim 1, wherein the rotor blade is dismounted from the rotor hub by disconnecting the rotor blade form the rotor hub and then lowering the rotor blade to the ground by operating the ground-based lift system and the nacelle-mounted lift system to lower the rotor blade.

7. The method of claim 1, wherein the rotor blade is mounted on the rotor hub by raising the rotor blade from the ground to the rotor hub by operating the ground-based lift system and the nacelle-mounted lift system to raise the rotor blade, and then connecting the rotor blade to the rotor hub.

8. A method of dismounting a rotor blade of a wind turbine, the method comprising:
mobilizing a ground-based lift system to a site of the wind turbine, the ground-based lift system having a boom with sufficient boom length to reach a rotor hub of the wind turbine;
rotating the rotor hub so that the rotor blade to be dismounted is substantially horizontal relative to the ground, and then locking rotation of the rotor hub;
opening a lid of a nacelle of the wind turbine;
using the ground-based lift system, lifting a nacelle-mountable lift system up to the nacelle and mounting the nacelle-mountable lift system to become a nacelle-mounted lift system on the nacelle so that a lift line of the nacelle-mounted lift system is extendible downward at a side of the rotor hub;
connecting a lift line of the ground-based lift system at a support location on the rotor blade at a tip-end of the rotor blade 2-3 m from the tip of the rotor blade;
connecting the lift line of the nacelle-mounted lift system at a hub-end of the rotor blade;
disconnecting the rotor blade from the rotor hub;
lowering the rotor blade toward the ground using the nacelle-mounted lift system and the ground-based lift system keeping the rotor blade substantially horizontal with respect to the ground; and,
once the rotor blade is lowered to ground-level so that the rotor blade is supported on the ground, disconnecting the lift lines from the rotor blade,
wherein the ground-based lift system and the nacelle-mounted lift system provide independent control over the motion of the rotor blade on each side of a center of gravity of the rotor blade.

9. The method of claim 8, further comprising optimizing the lowering of the rotor blade by using yaw capabilities of the nacelle to angle the rotor hub so that wind impinges on the rotor blade or rotor hub in a more favorable direction.

10. The method of claim 8, wherein the nacelle-mountable lift system comprises a nacelle-mountable crane comprising a base removably mountable on the nacelle of the wind turbine, a boom arm mounted on the base, a winch mounted on the boom arm, at least one sheave rotatably mounted on the boom arm, a holder and at least one lift cable passing over the at least one sheave connecting the holder to the winch, the boom arm positionable to position the holder beyond the side of the rotor hub when the crane is mounted on the nacelle, and the holder connected to the rotor blade at a hub-side position on the rotor blade.

* * * * *